United States Patent
Zheng

(10) Patent No.: US 11,043,675 B2
(45) Date of Patent: Jun. 22, 2021

(54) POSITIVE ELECTRODE MATERIAL AND LITHIUM-ION BATTERY

(71) Applicant: Ningde Amperex Technology Limited, Fujian (CN)

(72) Inventor: Chunfeng Zheng, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 141 days.

(21) Appl. No.: 16/166,150

(22) Filed: Oct. 21, 2018

(65) Prior Publication Data
US 2019/0252687 A1 Aug. 15, 2019

(30) Foreign Application Priority Data
Feb. 11, 2018 (CN) .......................... 201810141044.4

(51) Int. Cl.
| | |
|---|---|
| *H01M 4/525* | (2010.01) |
| *H01M 4/36* | (2006.01) |
| *H01M 4/02* | (2006.01) |
| *H01M 4/62* | (2006.01) |
| *H01M 10/0525* | (2010.01) |
| *H01M 4/505* | (2010.01) |

(52) U.S. Cl.
CPC .......... *H01M 4/628* (2013.01); *H01M 4/366* (2013.01); *H01M 4/505* (2013.01); *H01M 4/525* (2013.01); *H01M 10/0525* (2013.01); *H01M 2004/028* (2013.01)

(58) Field of Classification Search
CPC ...... H01M 4/628; H01M 4/366; H01M 4/505; H01M 4/525; H01M 10/0525; H01M 2004/028
See application file for complete search history.

(56) References Cited

U.S. PATENT DOCUMENTS

| | | | | |
|---|---|---|---|---|
| 2005/0130042 A1* | 6/2005 | Liu | ........................ | C01G 51/42 429/231.3 |
| 2014/0099539 A1* | 4/2014 | Yamazaki | ............. | C01B 33/113 429/211 |

FOREIGN PATENT DOCUMENTS

JP           2013182757 A   *  9/2013

OTHER PUBLICATIONS

EPO machine generated English translation of JP-2013182757-A (Year: 2013).*

(Continued)

*Primary Examiner* — Christopher P Domone
*Assistant Examiner* — Kimberly Wyluda
(74) *Attorney, Agent, or Firm* — Taylor English Duma LLP

(57) ABSTRACT

The present application provides a positive electrode material and a lithium-ion battery. The positive electrode material comprises a lithium composite oxide comprising lithium and at least one selected from a group of cobalt (Co), nickel (Ni), manganese (Mn), and a compound on the surface thereof comprising strontium (Sr) and at least one selected from a group of silicon (Si), titanium (Ti). By using above positive electrode material, the increased DC resistance during the circulation of the lithium-ion battery is greatly reduced.

15 Claims, 1 Drawing Sheet

(56) References Cited

OTHER PUBLICATIONS

SpringerMaterials SrO(SrTiO3)(Sr2TiO4) Crystal Structure. (Springer-Verlag GmbH, Heidelberg, © 2016). (Year: 2016).*

Ying Bai et al., Performance Improvement of LiCoO2 by YPO4 Surface-Modification and Its Mechanism, Research Papers, Jul. 2007, pp. 11-18.

Zheng, Chunfeng; Office Action for Chinese Application No. 201810141044.4, filed Feb. 11, 2018, dated Feb. 8, 2021, 8 pages.

* cited by examiner

POSITIVE ELECTRODE MATERIAL AND LITHIUM-ION BATTERY

PRIORITY CLAIM AND CROSS-REFERENCE

This application claims priority to and benefits of Chinese Patent Application Serial No. 201810141044.4 filed with the State Intellectual Property Office of P.R. China on Feb. 11, 2018, entitled "POSITIVE ELECTRODE MATERIAL AND LITHIUM-ION BATTERY", and the entire content of which is incorporated herein by reference.

FIELD OF THE APPLICATION

The present application relates to the field of battery, in particular, to a positive electrode material and a lithium-ion battery.

BACKGROUND OF THE APPLICATION

In recent years, with the popularization of portable products such as mobile phones and notebook computers, the demand for lithium-ion batteries is increasing. The positive electrode material is one of the core materials in lithium-ion battery. Its performance and quality directly affects the important performance of lithium-ion battery, such as capacity, life, safety and DC resistance (DCR).

At present, the DC resistance of lithium-ion batteries is an indicator attracted much attention. When the DC resistance of lithium-ion batteries increases too much during the cycle, the voltage will be caused to drop rapidly and the automatic shutdown of the mobile phone will occur. Therefore, there is an urgent need for a positive electrode material that inhibits the increase in DC resistance during cycling of a lithium-ion battery.

SUMMARY OF THE APPLICATION

In order to overcome the above problems existing in the prior art, some examples of the present application provide a positive electrode material comprising: a lithium composite oxide comprising lithium and at least one selected from a group of cobalt (Co), nickel (Ni) and manganese (Mn), and a compound on a surface thereof with strontium (Sr) and at least one selected from a group of silicon (Si) and titanium (Ti).

In the above positive electrode material, it comprises: a central portion comprising the lithium composite oxide, and a surface layer with the compound arranged on at least a portion of the central portion.

In the above positive electrode material, the content of strontium (Sr) on the surface of the positive electrode material is greater than the content of strontium (Sr) in the interior of the positive electrode material.

In the above positive electrode material, the content of the strontium (Sr) decreases from the surface of the positive electrode material to the interior of the positive electrode material.

In the above positive electrode material, the lithium composite oxide comprises at least one selected from a group of compounds represented by chemical formulas 1, 2, and 3:

  chemical formula 1 wherein M1 represents at least one selected from a group of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b and c are respectively in the following ranges: $0.8 \leq x \leq 1.2$, $0.8 \leq a \leq 1$, $0 \leq b \leq 0.2$, $-0.1 \leq c \leq 0.2$;

  chemical formula 2 wherein M2 represents at least one selected from a group of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), and silicon (Si), and the values of y, d, e and f are respectively in the following ranges: $0.8 \leq y \leq 1.2$, $0.3 \leq d \leq 0.98$, $0.02 \leq e \leq 0.7$, $-0.1 \leq f \leq 0.2$;

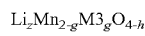  chemical formula 3 wherein M3 represents at least one selected from a group of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of z, g, and h are respectively in the following ranges: $0.8 \leq z \leq 1.2$, $0 \leq g \leq 1.0$ and $-0.2 \leq h \leq 0.2$.

In the above positive electrode material, the compound is selected from one or both of $Sr_2TiO_4$ and $Sr_2SiO_4$.

In the above positive electrode material, in the volume-based particle size distribution, the positive electrode material has a particle diameter of 4 μm to 25 μm reaching a volume accumulation of 50% from the small particle diameter.

In the above positive electrode material, the content of strontium (Sr) in the surface layer is 0.01 wt. % to 0.4 wt. % based on the total weight of the positive electrode material.

The present application further provides a positive electrode comprising: an active material layer; the active material layer comprises above positive electrode material.

The present application also provides a lithium-ion battery comprising above positive electrode.

The examples of the present application use $Sr_2TiO_4$, $Sr_2SiO_4$ or $Sr_2TiO_4$ and $Sr_2SiO_4$ with high structural stability as a surface layer, wherein the electrolyte reacts with water to form HF, and if HF is not consumed, HF will erode the surface of the lithium composite oxide and wreck the surface integrity of the lithium composite. However, using the surface layer of the present application, HF reacts with Sr in $Sr_2TiO_4$, $Sr_2SiO_4$ or $Sr_2TiO_4$ and $Sr_2SiO_4$ to form $SrF_2$, $SrF_2$ is a super acid and has a cleaning effect on insulating substances such as LiOH and $Li_2CO_3$ on the surface of the lithium composite oxide but does not erode the surface of the lithium composite oxide so that the active site of the lithium composite oxide (e.g., lithium cobalt oxide) is always at a high level, thereby ensuring that the DCR is maintained at a low level throughout the cycle. At the same time, Si, Ti or Si and Ti may prevent the active material on the surface of lithium composite oxide from directly contacting the electrolyte, inhibiting the decomposition of the electrolyte, thereby improving the cycle stability of the lithium-ion battery.

Compared with a lithium composite oxide that does not comprise the coating material $Sr_2TiO_4$, $Sr_2SiO_4$ or $Sr_2TiO_4$ and $Sr_2SiO_4$, the examples of the present application make the increase in DC resistance (DCR) of the lithium-ion battery significantly slow during the cycle by using the lithium composite oxide coated with $Sr_2TiO_4$, $Sr_2SiO_4$ or $Sr_2TiO_4$ and $Sr_2SiO_4$ without affecting the cycle performance of the lithium-ion battery.

BRIEF DESCRIPTION OF THE ACCOMPANYING DRAWINGS

DETAILED DESCRIPTION OF THE PREFERRED EXAMPLES

Figure 1:
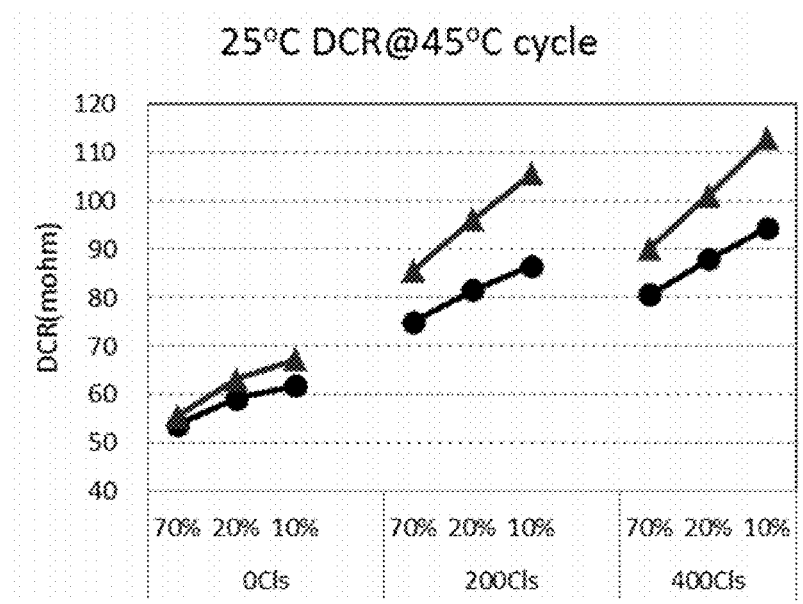
FIG. 1 shows a comparison chart of the DC resistance at 25° C. during the 45° C. cycle of Example 7 and Comparative Example 7 (▲: Comparative Example 7; ●: Example 7).

The exemplary examples are described in sufficient detail below, but these exemplary examples may be implemented in various ways and should not be construed as being limited to the examples set forth herein. Rather, these examples are provided so that the present application will be disclosed fully and completely, and the scope of the present application is fully conveyed to those skilled in the art.

In some examples of the present application, only the examples in which the lithium composite oxide is lithium cobalt oxide are illustrated, but the present application is not limited thereto, for example, the lithium composite oxide comprises lithium and at least one selected from a group of cobalt (Co), nickel (Ni), manganese (Mn).

The present application forms a surface layer comprising $Sr_2TiO_4$, $Sr_2SiO_4$ or $Sr_2TiO_4$ and $Sr_2SiO_4$ material on at least a portion of the surface of lithium cobalt oxide by a sol-gel method. After being coated with $Sr_2TiO_4$, $Sr_2SiO_4$ or $Sr_2TiO_4$ and $Sr_2SiO_4$, the increase in DC resistance of LCO coated with $Sr_2TiO_4$, $Sr_2SiO_4$ or $Sr_2TiO_4$ and $Sr_2SiO_4$ is significantly lower than the increase in DC resistance of LCO coated with $Al_2O_3$ with the increase of the number of cycles. This is because Sr of the surface coating material $Sr_2TiO_4$, $Sr_2SiO_4$ or $Sr_2TiO_4$ and $Sr_2SiO_4$ in the surface layer may react with the electrolyte to form a Lewis acid, Lewis acid has a cleaning effect on impurities such as insulating substances like LiOH and $Li_2CO_3$ on the surface of the lithium composite oxide so that the active site of the lithium composite oxide is always at a high level, thereby ensuring that the DCR is maintained at a low level throughout the cycle.

The lithium cobalt oxide (lithium composite oxide) in the examples of the present application comprises at least one selected from the compounds represented by chemical formula 1 and a combination thereof.

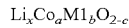 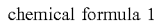

$$Li_xCo_aM1_bO_{2-c}$$ chemical formula 1 wherein M1 represents at least one selected from a group of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b and c are respectively in the following ranges: $0.8 \leq x \leq 1.2$, $0.8 \leq a \leq 1$, $0 \leq b \leq 0.2$, $-0.1 \leq c \leq 0.2$;

The surface layer comprises one or both of coating material selected from $Sr_2TiO_4$ and $Sr_2SiO_4$.

In the coating material, Si, Ti or Si and Ti may prevent the active material on the surface of lithium composite oxide from directly contacting the electrolyte, inhibiting the decomposition of the electrolyte, thereby improving the cycle stability of the lithium-ion battery. The precursor of Sr is an inorganic phosphonium salt comprise, but not limited to, cerium nitrate, cerium chloride, and cerium carbonate. The precursors of Si comprise, but are not limited to, tetraethyl orthosilicate (TEOS), methyl orthosilicate, and isopropyl orthosilicate. The precursors of Ti comprise, but are not limited to, isopropyl titanate and n-butyl titanate.

According to some examples, the content of strontium (Sr) in the surface layer is 0.01 wt. % to 0.4 wt. % based on the total weight of the positive electrode material. The surface layer formed by the coating material $Sr_2TiO_4$, $Sr_2SiO_4$ or $Sr_2TiO_4$ and $Sr_2SiO_4$ may react with the electrolyte to generate a Lewis acid, which has a cleaning effect on impurities such as insulating substances like LiOH and $Li_2CO_3$ on the surface of the lithium composite oxide so that the active site of the lithium composite oxide (lithium cobalt oxide) is always at a high level, thereby ensuring that the DCR is maintained at a low level throughout the cycle. However, when the coating amount is too large, the surface layer is too thick, which will hinder the diffusion of $Li^+$ to a certain extent, resulting in a decrease in the capacity. And when the content of strontium (Sr) is 0.15 wt. %, the performance of the lithium-ion battery is optimal, and there are many active sites during the cycle, and the DC resistance increases little. This is because when the content of strontium (Sr) is 0.15 wt. %, the active site of lithium cobalt oxide is kept at a high level, and the surface layer does not hinder the diffusion of $Li^+$, thereby allowing the lithium-ion battery to maintain a high capacity.

According to some examples, in the volume-based particle size distribution, the particle size (Dv50) reaching volume accumulation of 50% from the small particle size is between 4 μm and 25 μm. As the smaller the Dv50, the larger the specific surface area, the more active sites during the cycle, and the smaller the DC resistance increases. However, when the Dv50 is too small (<4 μm), it is not conducive to storage, and when Dv50 is too large (>25 μm), it is not conducive to the improvement of compaction density, so an appropriate interval for Dv50 (i.e., Dv50 is between 4 μm to 25 μm) shall be determined.

The preparation method of the positive electrode material will be as below.

A soluble inorganic phosphonium salt, silicon-containing compound, titanium-containing or silicon-containing compound and titanium-containing compound are dissolved in a solvent respectively, and then mixed to form a mixed solution; the pH of the mixed solution is adjusted by ammonia to a pH value of 7 to 9 to form a sol-like coating material solution, and then a lithium cobalt oxide (lithium composite oxide) is added into above sol-like coating material solution, and stirred for 0.15 to 4 hours; then, a suction filtration or drying is performed, and then calcination is performed in air or oxygen atmosphere at 750-950° C. for 1-10 h, followed by crushing and sieving (a commonly used method in the art) to form a positive electrode material coated with $Sr_2TiO_4$, $Sr_2SiO_4$ or $Sr_2TiO_4$ and $Sr_2SiO_4$, the positive electrode material having a Dv50 of between 4 μm and 25 μm; wherein the inorganic phosphonium salts comprise, but are not limited to, one or more selected from a group of cerium nitrate, cerium chloride, and cerium carbonate, the silicon-containing compounds comprise, but are not limited to, one or more selected from a group of tetraethyl orthosilicate (TEOS), methyl orthosilicate, and isopropyl orthosilicate, the titanium-containing compounds comprise, but are not limited to, one or both of isopropyl titanate and n-butyl titanate, and the solvents comprise, but are not limited to, one or more selected from a group of water, ethanol, and isopropanol.

Examples of the present application further provide a positive electrode comprising: a current collector and an active material layer arranged on the current collector; the active material layer comprises the above positive electrode material. The current collector may comprise, for example, a copper foil and an aluminum foil, and other current collectors commonly used in the art may also be employed.

Examples of the present application also provide a lithium-ion battery comprising the above positive electrode.

Examples of the present application also provide a lithium-ion battery. The lithium-ion battery comprises a positive electrode, a negative electrode, a separator, an electrolyte, and the like, wherein the positive electrode comprises the positive electrode material described in the present application.

Negative Electrode:

The negative electrode comprises a negative electrode material comprising the negative electrode material capable of intercalation/deintercalation of lithium (hereinafter, sometimes referred to as "negative electrode material capable of intercalation/deintercalation of lithium"). Examples of the negative electrode material capable of intercalation/deintercalation of lithium may comprise carbon materials, metal compounds, oxides, sulfides, nitrides of lithium such as $LiN_3$, lithium metal, metals which form alloys together with lithium and polymer materials.

Examples of carbon materials may comprise low graphitized carbon, easily graphitizable carbon, artificial graphite, natural graphite, mesocarbon microbeads, soft carbon, hard carbon, pyrolytic carbon, coke, vitreous carbon, organic polymer compound sintered body, carbon fiber and activated carbon. Among them, coke may comprise pitch coke, needle coke, and petroleum coke. The organic polymer compound sintered body refers to a material obtained by calcining a polymer material such as a phenol plastic or a furan resin at a suitable temperature for carbonizing, and some of these materials are classified into low graphitized carbon or easily graphitizable carbon. Examples of the polymer material may comprise polyacetylene and polypyrrole.

Further, in the negative electrode material capable of intercalation/deintercalation of lithium, a material whose charging and discharging voltages are close to the charging and discharging voltages of lithium metal is selected. This is because the lower the charging and discharging voltage of the negative electrode material, the easier for the battery to have a higher energy density. Among them, the negative electrode material may be selected from carbon materials because their crystal structures are only slightly changed upon charging and discharging, and therefore, good cycle characteristics as well as large charge and discharge capacities may be obtained. In particular, graphite may be selected because it gives a large electrochemical equivalent and a high energy density.

In addition, the negative electrode material capable of intercalation/deintercalation of lithium may comprise elemental lithium metal, metal elements and semimetal elements capable of forming an alloy together with lithium, and alloys and compounds comprising such metal elements and semimetal elements. In particular, they are used together with carbon materials because in this case, good cycle characteristics as well as high energy density may be obtained. In addition to alloys comprising two or more metal elements, the alloys used herein also comprise alloys comprising one or more metal elements and one or more semi-metal elements. The alloy may be in the form of a solid solution, a eutectic crystal (eutectic mixture), an intermetallic compound, and a mixture thereof.

Examples of the metal element and the semi-metal element may comprise tin (Sn), lead (Pb), aluminum (Al), indium (In), silicon (Si), zinc (Zn), antimony (Sb), bismuth (Bi), Cadmium (Cd), magnesium (Mg), boron (B), gallium (Ga), germanium (Ge), arsenic (As), silver (Ag), zirconium (Zr), yttrium (Y), and hafnium (Hf). Examples of above alloys and compounds may comprise a material having a chemical formula $Ma_sMb_tLi_u$ and a material having a chemical formula $Ma_pMc_qMd_r$. In these chemical formulae, Ma is at least one selected from a group of metal element and semi-metal element capable of forming an alloy together with lithium; Mb is at least one selected from a group of metal element and semi-metal element other than lithium and Ma; Mc is at least one selected from the non-metallic elements; Md is at least one selected from a group of metal element and semi-metal element other than Ma; and s, t, u, p, q and r meets: $s>0$, $t\geq 0$, $u\geq 0$, $p>0$, $q>0$ and $r\geq 0$.

Further, an inorganic compound not comprising lithium such as $MnO_2$, $V_2O_5$, $V_6O_{13}$, NiS, and MoS may be used in the negative electrode.

Electrolyte:

The electrolyte comprises a lithium salt and a non-aqueous solvent.

The lithium salt comprises at least one selected from a group of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, LiBOB, LiBr and lithium difluoroborate. For example, the lithium salt is $LiPF_6$ because it may provide high ionic conductivity and improved cycle characteristics.

The non-aqueous solvent may be a carbonate compound, an ester-based compound, an ether-based compound, a ketone-based compound, an alcohol-based compound, an aprotic solvent, or a combination thereof.

The carbonate compound may be a chain carbonate compound, a cyclic carbonate compound, a fluorocarbonate compound, or a combination thereof.

Examples of the chain carbonate compound comprise diethyl carbonate (DEC), dimethyl carbonate (DMC), dipropyl carbonate (DPC), methylpropyl carbonate (MPC), ethylene propyl carbonate (EPC), and methyl ethyl carbonate (MEC) and combinations thereof. Examples of the cyclic carbonate compound comprise ethylene carbonate (EC), propylene carbonate (PC), butylene carbonate (BC), vinyl ethylene carbonate (VEC), and combinations thereof. Examples of the fluorocarbonate compound comprise fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and combinations thereof.

Examples of the ester-based compound are methyl acetate, ethyl acetate, n-propyl acetate, t-butyl acetate, methyl propionate, ethyl propionate, γ-butyrolactone, azlactone, valerolactone, mevalonolactone, caprolactone, methyl formate and combinations thereof.

Examples of the ether-based compound are dibutyl ether, tetraglyme, diglyme, 1,2-dimethoxyethane, 1,2-diethoxyethane, ethoxymethoxyethane, 2-methyltetrahydrofuran, tetrahydrofuran, and combinations thereof.

An example of the ketone-based compound is cyclohexanone.

Examples of alcohol-based compounds are ethanol and isopropanol.

Examples of aprotic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, nitromethane, trimethyl phosphate, triethyl phosphate, trioctyl phosphate and phosphate, and combinations thereof.

Separator:

The separator comprises at least one selected from a group of polyethylene, polypropylene, polyethylene terephthalate, polyimide, and aramid. For example, the polyethylene comprises at least one component selected from a group of high density polyethylene, low density polyethylene, and ultra high molecular weight polyethylene. In particular, polyethylene and polypropylene, which have a good effect on preventing short circuits, and can improve the stability of the battery by the shutdown effect.

The surface of separator may further comprise a porous layer arranged on at least one surface of the separator, the porous layer comprising inorganic particles and a binder. The inorganic particle is one or more selected from a group of alumina ($Al_2O_3$), silica ($SiO_2$), magnesia (MgO), titania ($TiO_2$), ceria ($HfO_2$), tin oxide ($SnO_2$), cerium oxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide and barium sulfate. The binder is one or more selected from a group of polyvinylidene fluoride, a copolymer of vinylidene fluoride-hexafluoropropylene, polyamide, polyacrylonitrile, polyacrylate, polyacrylic acid, polyacrylate, sodium carboxymethylcellulose, polyvinylpyrrolidone, polyvinyl ether, polymethylmethacrylate, polytetrafluoroethylene and polyhexafluoropropylene.

The porous layer on the surface of the separator may improve the heat resistance, oxidation resistance and electrolyte wetting property of the separator, and enhance the adhesion between the separator and the electrode.

The positive electrode material of the present application may be used in a lithium-ion battery of different structures. In the examples, a wound lithium-ion battery is taken as an example, but the positive electrode material of the present application may be applied to lithium-ion batteries of a laminated structure, a multi-tab structure or the like, all of which are comprised within the scope of this application.

The positive electrode material of the present application may be used in a lithium-ion battery of different types. In the examples, a soft pack lithium-ion battery is taken as an example, but the positive electrode material of the present application may be applied to other lithium-ion batteries such as square shell battery, cylindrical shell battery, all of which are comprised within the scope of this application.

Those skilled person in the art will appreciate that the above described methods for preparing the lithium-ion battery are merely examples. Other methods commonly used in the art may be employed without departing from the disclosure of the present application.

Some specific examples and comparative examples are listed below to better illustrate the application.

Example 1

Strontium nitrate of 17.67 g and ethyl orthosilicate of 8.69 g are dissolved in water respectively (fully dissolved), mixed to form a mixed solution, ammonia water is dripped to adjust the pH of the mixed solution to 9 and fully stirred for 10 minutes, then $LiCoO_2$ of 5000 g is added for stirring for another 1 h followed by suction filtration, drying, and calcination at 900° C. under the air atmosphere for 4 h; then the sintered sample is crushed and sieved to obtain a positive electrode material coated with $Sr_2SiO_4$ having a Dv50 of 4 μm, and then the obtained positive electrode material is subjected to inductively coupled plasma mass spectrometry (ICP) test, and the content of strontium (Sr) is 0.15 wt. %. The obtained coated positive electrode material is subjected to full battery preparation and tested for direct current resistance (DCR).

Example 2

The method here is consistent with the preparation method of Example 1, except that the positive electrode material coated with $Sr_2SiO_4$ obtained by Example 2 is one having a Dv50 of 10 μm.

Example 3

The method here is consistent with the preparation method of Example 1, except that the positive electrode material coated with $Sr_2SiO_4$ obtained by Example 3 is one having a Dv50 of 15 μm.

Example 4

The method here is consistent with the preparation method of Example 1, except that the positive electrode material coated with $Sr_2SiO_4$ obtained by Example 4 is one having a Dv50 of 20 μm.

Example 5

The method here is consistent with the preparation method of Example 1, except that the positive electrode material coated with $Sr_2SiO_4$ obtained by Example 5 is one having a Dv50 of 25 μm.

Example 6

The method here is consistent with the preparation method of Example 1, except that the lithium composite oxide used in Example 6 is $LiCo_{0.94}Mg_{0.02}Al_{0.02}Ti_{0.02}O_2$ and the positive electrode material coated with $Sr_2SiO_4$ obtained is one having a Dv50 of 15 μm.

Example 7

The method here is consistent with the preparation method of Example 1, except that the lithium composite oxide used in Example 7 is $LiCo_{0.97}Mg_{0.015}Al_{0.02}O_2$ and the positive electrode material coated with $Sr_2SiO_4$ obtained is one having a Dv50 of 15 μm.

Example 8

The method here is consistent with the preparation method of Example 1, except that the lithium composite oxide used in Example 8 is $LiCo_{0.95}Mg_{0.015}Ti_{0.03}O_2$ and the positive electrode material coated with $Sr_2SiO_4$ obtained is one having a Dv50 of 15 μm.

Example 9

The method here is consistent with the preparation method of Example 1, except that the lithium composite oxide used in Example 9 is $LiCo_{0.94}Mg_{0.015}Al_{0.02}Y_{0.03}O_2$ and the positive electrode material coated with $Sr_2SiO_4$ obtained is one having a Dv50 of 15 μm.

Example 10

The method here is consistent with the preparation method of Example 1, except that the lithium composite oxide used in Example 10 is $LiCo_{0.99}Mg_{0.015}O_2$ and the positive electrode material coated with $Sr_2SiO_4$ obtained is one having a Dv50 of 15 μm.

Example 11

Strontium nitrate of 4.71 g is dissolved in isopropanol and ethyl orthosilicate of 2.32 g is dissolved in water, mixed to form a mixed solution, ammonia water is dripped to adjust the pH of the mixed solution to 8 and fully stirred for 10 minutes, then $LiCo_{0.97}Mg_{0.015}Al_{0.02}O_2$ of 5000 g is added for stirring for another 0.15 h followed by suction filtration, drying, and calcination at 950° C. under the oxygen atmosphere for 1 h; then the sintered sample is crushed and sieved to obtain a positive electrode material coated with $Sr_2SiO_4$ having a Dv50 of 15 μm, and then the obtained positive electrode material is subjected to inductively coupled plasma mass spectrometry (ICP) test, and the content of strontium (Sr) is 0.01 wt. %. The obtained coated positive electrode material is subjected to full battery preparation and tested for direct current resistance (DCR).

Example 12

Strontium carbonate of 12.32 g is dissolved in water and methyl orthosilicate of 12.7 g is dissolved in isopropanol, mixed to form a mixed solution, ammonia water is dripped to adjust the pH of the mixed solution to 7 and fully stirred for 20 minutes, then $LiCo_{0.97}Mg_{0.015}Al_{0.02}O_2$ of 5000 g is added for stirring for another 2 h followed by suction filtration, drying, and calcination at 750° C. under the oxygen atmosphere for 10 h; then the sintered sample is crushed and sieved to obtain a positive electrode material coated with $Sr_2SiO_4$ having a Dv50 of 15 μm, and then the obtained positive electrode material is subjected to inductively coupled plasma mass spectrometry (ICP) test, and the content of strontium (Sr) is 0.25 wt. %. The obtained coated positive electrode material is subjected to full battery preparation and tested for direct current resistance (DCR).

Example 13

Strontium chloride of 18.55 g and strontium nitrate of 14.72 g are dissolved in ethanol, and isopropyl orthosilicate of 18.39 g and ethyl orthosilicate of 14.49 g are dissolved in water, mixed to form a mixed solution, ammonia water is dripped to adjust the pH of the mixed solution to 9 and fully stirred for 30 minutes, then $LiCo_{0.97}Mg_{0.015}Al_{0.02}O_2$ of 5000 g is added for stirring for another 4 h followed by suction filtration, drying, and calcination at 800° C. under the oxygen atmosphere for 5 h; then the sintered sample is crushed and sieved to obtain a positive electrode material coated with $Sr_2SiO_4$ having a Dv50 of 15 μm, and then the obtained positive electrode material is subjected to inductively coupled plasma mass spectrometry (ICP) test, and the content of strontium (Sr) is 0.40 wt. %. The obtained coated positive electrode material is subjected to full battery preparation and tested for direct current resistance (DCR).

Example 14

Strontium nitrate of 8.84 g and ethyl orthosilicate of 4.35 g are dissolved in water respectively, mixed to form a mixed solution A; and strontium nitrate of 5.53 g is dissolved in water and N-butyl titanate of 4.45 g is dissolved in ethanol, mixed to form a mixed solution B; ammonia water is dripped into mixed solution A to adjust the pH of the mixed solution A to 9 and fully stirred for 30 minutes, then the mixed solution A and the mixed solution B are mixed to form a mixed solution, and $LiCoO_2$ of 5000 g is added into the mixed solution for stirring for another 4 h followed by suction filtration, drying, and calcination at 800° C. under the oxygen atmosphere for 5 h; then the sintered sample is crushed and sieved to obtain a positive electrode material coated with $Sr_2SiO_4$ and $Sr_2TiO_4$ having a Dv50 of 15 μm, and then the obtained positive electrode material is subjected to inductively coupled plasma mass spectrometry (ICP) test, and the content of strontium (Sr) is 0.15 wt. %. The obtained coated positive electrode material is subjected to full battery preparation and tested for direct current resistance (DCR).

Example 15

Strontium nitrate of 2.95 g and isopropyl titanate of 1.98 g are dissolved in water respectively, mixed to form a mixed solution, ammonia water is dripped to adjust the pH of the mixed solution to 8 and fully stirred for 30 minutes, then $LiCoO_2$ of 5000 g is added for stirring for another 4 h followed by suction filtration, drying, and calcination at 800° C. under the oxygen atmosphere for 5 h; then the sintered sample is crushed and sieved to obtain a positive electrode material coated with $Sr_2TiO_4$ having a Dv50 of 15 μm, and then the obtained positive electrode material is subjected to inductively coupled plasma mass spectrometry (ICP) test, and the content of strontium (Sr) is 0.01 wt. %. The obtained coated positive electrode material is subjected to full battery preparation and tested for direct current resistance (DCR).

Example 16

Strontium nitrate of 11.05 g is dissolved in water and isopropyl titanate of 7.42 g is dissolved in ethanol, mixed to form a mixed solution, ammonia water is dripped to adjust the pH of the mixed solution to 7 and fully stirred for 30 minutes, then $LiCo_{0.97}Mg_{0.015}Al_{0.02}O_2$ of 5000 g is added for stirring for another 4 h followed by suction filtration, drying, and calcination at 800° C. under the oxygen atmosphere for 5 h; then the sintered sample is crushed and sieved to obtain a positive electrode material coated with $Sr_2TiO_4$ having a Dv50 of 15 μm, and then the obtained positive electrode material is subjected to inductively coupled plasma mass spectrometry (ICP) test, and the content of strontium (Sr) is 0.15 wt. %. The obtained coated positive electrode material is subjected to full battery preparation and tested for direct current resistance (DCR).

Example 17

Strontium chloride of 13.93 g and strontium nitrate of 11.05 g are dissolved in ethanol, and isopropyl titanate of 7.42 g and N-butyl titanate of 8.89 g are dissolved in water, mixed to form a mixed solution, ammonia water is dripped to adjust the pH of the mixed solution to 9 and fully stirred for 30 minutes, then $LiCo_{0.97}Mg_{0.015}Al_{0.02}O_2$ of 5000 g is added for stirring for another 4 h followed by suction filtration, drying, and calcination at 800° C. under the oxygen atmosphere for 5 h; then the sintered sample is crushed and sieved to obtain a positive electrode material coated with $Sr_2TiO_4$ having a Dv50 of 15 μm, and then the obtained positive electrode material is subjected to inductively coupled plasma mass spectrometry (ICP) test, and the content of strontium (Sr) is 0.25 wt. %. The obtained coated positive electrode material is subjected to full battery preparation and tested for direct current resistance (DCR).

Example 18

Strontium nitrate of 36.86 g is dissolved in ethanol and isopropyl titanate of 24.75 g is dissolved in water, mixed to form a mixed solution, ammonia water is dripped to adjust the pH of the mixed solution to 9 and fully stirred for 30 minutes, then $LiCo_{0.97}Mg_{0.015}Al_{0.02}O_2$ of 5000 g is added for stirring for another 4 h followed by suction filtration, drying, and calcination at 800° C. under the oxygen atmosphere for 5 h; then the sintered sample is crushed and sieved to obtain a positive electrode material coated with $Sr_2TiO_4$ having a Dv50 of 15 μm, and then the obtained positive electrode material is subjected to inductively coupled plasma mass spectrometry (ICP) test, and the content of strontium (Sr) is 0.40 wt. %. The obtained coated positive electrode material is subjected to full battery preparation and tested for direct current resistance (DCR).

Comparative Example 1

The method here is consistent with the preparation method of Example 1, except that the positive electrode material in Comparative Example 1 is not coated with $Sr_2SiO_4$.

Comparative Example 2

The method here is consistent with the preparation method of Example 2, except that the positive electrode material in Comparative Example 2 is not coated with $Sr_2SiO_4$.

Comparative Example 3

The method here is consistent with the preparation method of Example 3, except that the positive electrode material in Comparative Example 3 is not coated with $Sr_2SiO_4$.

Comparative Example 4

The method here is consistent with the preparation method of Example 4, except that the positive electrode material in Comparative Example 4 is not coated with $Sr_2SiO_4$.

Comparative Example 5

The method here is consistent with the preparation method of Example 5, except that the positive electrode material in Comparative Example 5 is not coated with $Sr_2SiO_4$.

Comparative Example 6

The method here is consistent with the preparation method of Example 6, except that the positive electrode material in Comparative Example 6 is not coated with $Sr_2SiO_4$.

Comparative Example 7

The method here is consistent with the preparation method of Example 7, except that the positive electrode material in Comparative Example 7 is not coated with $Sr_2SiO_4$.

Comparative Example 8

The method here is consistent with the preparation method of Example 8, except that the positive electrode material in Comparative Example 8 is not coated with $Sr_2SiO_4$.

Comparative Example 9

The method here is consistent with the preparation method of Example 9, except that the positive electrode material in Comparative Example 9 is not coated with $Sr_2SiO_4$.

Comparative Example 10

The method here is consistent with the preparation method of Example 10, except that the positive electrode material in Comparative Example 10 is not coated with $Sr_2SiO_4$.

Test Process for Cycle Direct Current Resistance (DCR):
1) stand for 4 h in a cryogenic box at 25° C.,
2) charging to 4.35V with a constant current of 0.7 C (ie, the current value of theoretical capacity is completely discharged within 2 h), charging to 0.025 C with a constant voltage of 4.35V, and at rest for 10 min,
3) discharging to 3.4V with 0.1 C, at rest for 5 min (obtaining the actual capacity in this step)
Test for DCR at 25° C.,
4) at rest for 5 min, charging to 4.35 V with a constant current of 0.7 C, charging to 0.025 C with a constant voltage of 4.35V (calculated with the actual capacity obtained in step 3),
5) at rest for 10 min,
6) discharging for 3 h with 0.1 C (calculated with the actual capacity obtained in step 3 to obtain 70% SOC (remaining battery capacity) direct current resistance),
7) discharging for 1 s with 1 C (collecting points at 5 ms, capacity is calculated by the labeled capacity of the corresponding battery component),
8) discharging for 5 h with 0.1 C (calculated with the actual capacity obtained in step 3 to obtain 20% SOC direct current resistance),
9) discharging for 1 s with 1 C (collecting points at 5 ms, capacity is calculated by the labeled capacity of the corresponding battery component),
10) discharging for 1 h with 0.1 C (calculated with the actual capacity obtained in step 3 to obtain 10% SOC direct current resistance),
11) discharging for 1 s with 1 C (collecting points at 5 ms, capacity is calculated by the labeled capacity of the corresponding battery component),
12) discharging to 3.4V with 0.1 C (calculated with the actual capacity obtained in step 3),
13) at rest for 5 min.

After the initial direct current resistance has been measured, the battery is cyclically tested. The test process is as follows:
1) charging to 4.35V with a constant current of 0.7 C, charging to 0.05 C with a constant voltage of 4.35V, 2) at rest for 5 min,
3) discharging to 3V with a constant current of 1 C
4) performing step (1) to step (3) cyclically for 400 cls
Continue to test the direct current resistance after cycling for 400 cls, the flow of which is the same as the initial direct current resistance test.

Growth rate of DCR=(DCR of 400 cls−initial DCR)/initial DCR.

Test standards for Initial discharging capacity: charging to 4.35V with a constant current of 0.5 C, charging to 0.05 C with a constant voltage of 4.35V, and discharging to 3V with a constant current of 0.5 C.

The test results of the respective examples and comparative examples are shown in Table 1 below. For convenience of comparison, the results of Table 1 are shown in groups.

μm), it is not conducive to storage, and when Dv50 is too large (>25 μm), it is not conducive to compaction density and DCR thereof. When Dv50 of the positive electrode material is 15 μm, the positive electrode material is easier to prepare and the DCR is significantly reduced.

By comparing the results of Examples 1-5 with the results of Comparative Examples 1-5, it shows that by using the positive electrode material coated with $Sr_2SiO_4$ in examples of the present application, the growth rate of DCR at 25° C. for the lithium-ion battery is significantly lowered during the cycle of the lithium-ion battery while the capacity of the initial discharge remaining substantially unchanged, thereby improving the performance of the lithium-ion battery. This is because the electrolyte reacts with water to form HF, and HF may react with Sr in $Sr_2SiO_4$ to generate $SrF_2$, $SrF_2$ is a

TABLE 1

| | lithium composite oxide | compound in surface layer | content of Sr (wt. %) | particle size Dv50 of positive electrode material (μm) | 45° C. cycle 400 cls 25° C. 10% SOC DCR growth rate | initial discharge capacity (mAh/g) |
|---|---|---|---|---|---|---|
| Examples | | | | | | |
| 1 | $LiCoO_2$ | $Sr_2SiO_4$ | 0.15 | 4 | 54% | 167.5 |
| 2 | $LiCoO_2$ | | 0.15 | 10 | 67% | 166.7 |
| 3 | $LiCoO_2$ | | 0.15 | 15 | 68% | 166.3 |
| 4 | $LiCoO_2$ | | 0.15 | 20 | 79% | 166 |
| 5 | $LiCoO_2$ | | 0.15 | 25 | 86% | 165.4 |
| 6 | $LiCo_{0.94}Mg_{0.02}Al_{0.02}Ti_{0.02}O_2$ | $Sr_2SiO_4$ | 0.15 | 15 | 53.70% | 166.6 |
| 7 | $LiCo_{0.97}Mg_{0.015}Al_{0.02}O_2$ | | 0.15 | 15 | 59% | 166.8 |
| 8 | $LiCo_{0.95}Mg_{0.015}Ti_{0.03}O_2$ | | 0.15 | 15 | 53% | 166.7 |
| 9 | $LiCo_{0.94}Mg_{0.015}Al_{0.02}Y_{0.03}O_2$ | | 0.15 | 15 | 61% | 166 |
| 10 | $LiCo_{0.99}Mg_{0.015}O_2$ | | 0.15 | 15 | 55.70% | 166.5 |
| 11 | $LiCo_{0.97}Mg_{0.015}Al_{0.02}O_2$ | $Sr_2SiO_4$ | 0.01 | 15 | 56.90% | 166.6 |
| 7 | $LiCo_{0.97}Mg_{0.015}Al_{0.02}O_2$ | | 0.15 | 15 | 59% | 166.8 |
| 12 | $LiCo_{0.97}Mg_{0.015}Al_{0.02}O_2$ | | 0.25 | 15 | 56.60% | 165.4 |
| 13 | $LiCo_{0.97}Mg_{0.015}Al_{0.02}O_2$ | | 0.4 | 15 | 64.20% | 164.2 |
| 14 | $LiCoO_2$ | $Sr_2SiO_4$ and $Sr_2TiO_4$ | 0.15 | 15 | 70.10% | 166.6 |
| 15 | $LiCo_{0.97}Mg_{0.015}Al_{0.02}O_2$ | $Sr_2TiO_4$ | 0.01 | 15 | 61.50% | 166.9 |
| 16 | $LiCo_{0.97}Mg_{0.015}Al_{0.02}O_2$ | | 0.15 | 15 | 58.30% | 166.6 |
| 17 | $LiCo_{0.97}Mg_{0.015}Al_{0.02}O_2$ | | 0.25 | 15 | 61.20% | 165.7 |
| 18 | $LiCo_{0.97}Mg_{0.015}Al_{0.02}O_2$ | | 0.4 | 15 | 68.80% | 164.5 |
| Comparative Examples | | | | | | |
| 1 | $LiCoO_2$ | / | / | 4 | 87% | 167.2 |
| 2 | $LiCoO_2$ | / | / | 10 | 95% | 166 |
| 3 | $LiCoO_2$ | / | / | 15 | 99% | 166 |
| 4 | $LiCoO_2$ | / | / | 20 | 117% | 165.8 |
| 5 | $LiCoO_2$ | / | / | 25 | 122% | 165.3 |
| 6 | $LiCo_{0.94}Mg_{0.02}Al_{0.02}Ti_{0.02}O_2$ | / | / | 15 | 75% | 166.3 |
| 7 | $LiCo_{0.97}Mg_{0.015}Al_{0.02}O_2$ | / | / | 15 | 86% | 166.4 |
| 8 | $LiCo_{0.95}Mg_{0.015}Ti_{0.03}O_2$ | / | / | 15 | 78% | 166.1 |
| 9 | $LiCo_{0.94}Mg_{0.015}Al_{0.02}Y_{0.03}O_2$ | / | / | 15 | 88% | 165.7 |
| 10 | $LiCo_{0.99}Mg_{0.015}O_2$ | / | / | 15 | 79% | 166 |

As can be seen from Table 1, according to Examples 1 to 5, by determining the content of strontium and changing the Dv50 of the positive electrode material, it is found that when the Dv50 of the positive electrode material coated with the coating material is 4 to 25 μm, the growth rate of DCR at 25° C. for the lithium-ion battery is greatly lowered and the capacity of the initial discharge remains substantially unchanged. This is because the smaller the Dv50, the larger the specific surface area, the more active sites during the cycle of lithium-ion battery, and the smaller the DC resistance increase. However, when the Dv50 is too small (<4 super acid and has a cleaning effect on impurities such as insulating substances like LiOH and $Li_2CO_3$ on the surface of lithium cobalt oxide (lithium composite oxide) so that the active site of the lithium cobalt oxide is always at a high level, thereby ensuring that the DCR is maintained at a low level throughout the cycle. At the same time, Si may enhance the cycle performance of lithium-ion battery and may prevent the active material on the surface of positive electrode material from contacting the electrolyte, inhibiting the decomposition of the electrolyte, thereby improving the cycle stability of the lithium-ion battery.

By comparing comparative examples 6 to 10 with comparative examples 1 to 5, it shows that when lithium cobalt oxide is doped with doping element, coated with a coating element or doped with doping element and coated with a coating element, such as magnesium (Mg), aluminum (Al), titanium (Ti), ytterbium (Y), it may be helpful to improve the cyclic performance of lithium-ion battery with limited effects of the improvement. Further, by comparing Examples 6 to 10 with Comparative Examples 6 to 10, it shows that in the case where there are doped elements, the lithium-ion battery made of the positive electrode material coated with $Sr_2SiO_4$ has a lower growth rate of DCR while the initial discharge capacity of the lithium-ion battery remaining substantially unchanged as compared with the lithium-ion battery made of the positive electrode material that not coated with $Sr_2SiO_4$. This is because the coating of $Sr_2SiO_4$ generates more active sites during the cycle of the lithium-ion battery, which reduces the growth rate of DCR for the lithium-ion battery.

By comparing Example 3 with Examples 6 to 10, it shows that, in the case where the lithium composite oxide is $LiCoO_2$, when the lithium composite oxide is doped, coated or doped and coated $LiCoO_2$, the effect of improving DCR during the cycle of lithium-ion battery is more obvious by $Sr_2SiO_4$ coating.

According to Example 7 and Examples 11 to 13, by determining Dv50 of the positive electrode material and changing the content of strontium (Sr), it is found that when the content of strontium (Sr) accounts for 0.01-0.40% of the total weight of the positive electrode material, the growth rate of DCR at 25° C. during the cycle of the lithium-ion battery may be significantly reduced while the initial discharge capacity remaining substantially unchanged. This is because the active site is kept at a high level during the cycle after coating of $Sr_2SiO_4$ is performed, and the growth rate of DCR is small. However, when the content of strontium (Sr) is too large (>0.40%), the surface layer is too thick so that the $Li^+$ diffusion is hindered to a certain extent and the cycle performance of the lithium-ion battery is lowered while decreasing the capacity. Therefore, when the content of strontium (Sr) is 0.15 wt. %, the performance of the lithium-ion battery is optimal, and the growth rate of DCR during the cycle is low.

By comparing the results of Example 14 with the results of Comparative Examples 1-5, it shows that by using the positive electrode material coated with $Sr_2SiO_4$ and $Sr_2TiO_4$, the cycle performance of prepared lithium-ion battery is enhanced and the growth rate of DCR at 25° C. for the lithium-ion battery is significantly lowered during the cycle while the capacity of the initial discharge remaining substantially unchanged, thereby improving the performance of the lithium-ion battery. This is because the electrolyte reacts with water to form HF, and HF may react with Sr in $Sr_2SiO_4$ and $Sr_2TiO_4$ to generate $SrF_2$, $SrF_2$ is a super acid and has a cleaning effect on impurities such as insulating substances like LiOH and $Li_2CO_3$ on the surface of lithium cobalt oxide (lithium composite oxide) so that the active site of the lithium cobalt oxide is always at a high level, thereby ensuring that the DCR is maintained at a low level throughout the cycle. At the same time, Si and Ti may prevent the active material on the surface of lithium cobalt oxide (lithium composite oxide) from contacting the electrolyte, inhibiting the decomposition of the electrolyte, thereby improving the cycle stability of the lithium-ion battery.

According to Example 15 to 18, by determining Dv50 of the positive electrode material and changing the content of strontium (Sr), it is found that when the content of strontium (Sr) accounts for 0.01-0.40% of the total weight of the positive electrode material, the growth rate of DCR at 25° C. during the cycle of the lithium-ion battery may be significantly reduced while the initial discharge capacity remaining substantially unchanged. This is because the active site is kept at a high level during the cycle after coating of $Sr_2TiO_4$ is performed, and the growth rate of DCR is small. However, when the content of strontium (Sr) is too large (>0.40%), the surface layer is too thick so that the $Li^+$ diffusion is hindered to a certain extent and the cycle performance of the lithium-ion battery is lowered while decreasing the capacity. Therefore, when the content of strontium (Sr) is 0.15 wt. %, the performance of the lithium-ion battery is optimal, and the growth rate of DCR during the cycle is low.

FIG. 1 shows a comparison chart of DCR at 25° C. during the 45° C. cycle of Example 7 and Comparative Example 7. It can be seen from FIG. 1 that the positive electrode material coated with $Sr_2SiO_4$ significantly reduces DCR of the positive electrode material coated with conventional materials such as Al and Mg, and the initial discharge capacity remains substantially unchanged.

Figure 2:
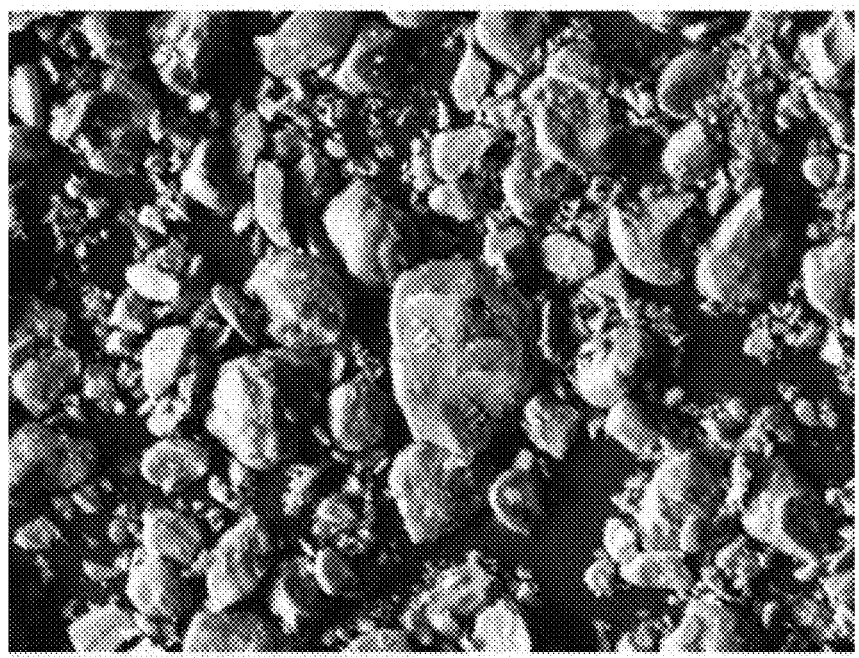
FIG. 2 shows a scanning electron micrograph of a positive electrode material of the lithium cobalt oxide coated with $Sr_2SiO_4$ in Example 1.

FIG. 2 shows a scanning electron micrograph of a positive electrode material of the lithium cobalt oxide coated with $Sr_2SiO_4$ in Example 1. It can be clearly seen from FIG. 2 that $Sr_2SiO_4$ is uniformly coated on the surface of lithium cobalt oxide (lithium composite oxide).

Those skilled in the art will appreciate that the above-described examples are merely exemplary examples, and various changes, substitutions and changes may be made without departing from the spirit and scope of the present application.

What is claimed is:

1. A positive electrode material, comprising:
   a lithium composite oxide comprising lithium and at least one selected from the group consisting of cobalt, nickel and manganese, and
   a compound on a surface of the lithium composite oxide, comprising $Sr_2TiO_4$ and $Sr_2SiO_4$.

2. The positive electrode material according to claim 1, comprising:
   a central portion with the lithium composite oxide, and
   a surface layer with the compound arranged on at least a portion of the central portion.

3. The positive electrode material according to claim 1, wherein the content of strontium on a surface of the positive electrode material is greater than the content of strontium in the interior of the positive electrode material.

4. The positive electrode material according to claim 2, wherein the content of strontium decreases from a surface of the positive electrode material to the interior of the positive electrode material.

5. The positive electrode material according to claim 1, wherein the lithium composite oxide comprises at least one selected from a group of compounds represented by chemical formulas 1, 2, and 3:

  chemical formula 1 wherein M1 represents at least one selected from the group consisting of nickel, manganese, magnesium, aluminum, boron, titanium, vanadium, chromium, iron, copper, zinc, molybdenum, tin, calcium, strontium, tungsten, yttrium, lanthanum, zirconium, or silicon, and the values of x, a, b and c are respectively in the following ranges: 0.8≤x≤1.2, 0.8≤a≤1, 0≤b≤0.2, −0.1≤c≤0.2;

$Li_yNi_dM2_eO_{2-f}$   chemical formula 2 wherein M2 represents at least one selected from the group consisting of cobalt, manganese, magnesium, aluminum, boron, titanium, vanadium, chromium, iron, copper, zinc, molybdenum, tin, calcium, strontium, tungsten, zirconium, or silicon, and the values of y, d, e and f are respectively in the following ranges: $0.8 \le y \le 1.2$, $0.3 \le d \le 0.98$, $0.02 \le e \le 0.7$, $-0.1 \le f \le 0.2$;

$Li_zMn_{2-g}M3_gO_{4-h}$   chemical formula 3 wherein M3 represents at least one selected from the group consisting of cobalt, nickel, magnesium, aluminum, boron, titanium, vanadium, chromium, iron, copper, zinc, molybdenum, tin, calcium, strontium or tungsten, and the values of z, g, and h are respectively in the following ranges: $0.8 \le z \le 1.2$, $0 \le g \le 1.0$ and $-0.2 \le h \le 0.2$.

6. The positive electrode material according to claim 1, wherein in a volume-based particle size distribution, the positive electrode material has a particle diameter of 4 μm to 25 μm reaching a volume accumulation of 50% from the small particle diameter.

7. The positive electrode material according to claim 2, wherein the content of strontium in the compound on the surface of the lithium composite is 0.01 wt. % to 0.4 wt. % based on the total weight of the positive electrode material.

8. A positive electrode, comprising a positive electrode material, wherein the positive electrode material comprising:
a lithium composite oxide comprising lithium and at least one selected from the group consisting of cobalt, nickel and manganese, and
a compound on a surface of the lithium composite oxide, comprising $Sr_2TiO_4$ and $Sr_2SiO_4$.

9. The positive electrode according to claim 8, comprising:
a central portion with the lithium composite oxide, and
a surface layer with the compound arranged on at least a portion of the central portion.

10. The positive electrode according to claim 8, wherein the content of strontium on a surface of the positive electrode material is greater than the content of strontium in the interior of the positive electrode material.

11. The positive electrode according to claim 9, wherein the content of the strontium decreases from a surface of the positive electrode material to the interior of the positive electrode material.

12. The positive electrode according to claim 8, wherein the lithium composite oxide comprises at least one selected from a group of compounds represented by chemical formulas 1, 2, and 3:

$Li_xCo_aM1_bO_{2-c}$   chemical formula 1 wherein M1 represents at least one selected from the group consisting of nickel, manganese, magnesium, aluminum, boron, titanium, vanadium, chromium, iron, copper, zinc, molybdenum, tin, calcium, strontium, tungsten, yttrium, lanthanum, zirconium, and silicon, and the values of x, a, b and c are respectively in the following ranges: $0.8 \le x \le 1.2$, $0.8 \le a \le 1$, $0 \le b \le 0.2$, $-0.1 \le c \le 0.2$;

$Li_yNi_dM2_eO_{2-f}$   chemical formula 2 wherein M2 represents at least one selected from the group consisting of cobalt, manganese, magnesium, aluminum, boron, titanium, vanadium, chromium, iron, copper, zinc, molybdenum, tin, calcium, strontium, tungsten, zirconium, and silicon, and the values of y, d, e and f are respectively in the following ranges: $0.8 \le y \le 1.2$, $0.3 \le d \le 0.98$, $0.02 \le e \le 0.7$, $-0.1 \le f \le 0.2$;

$Li_zMn_{2-g}M3_gO_{4-h}$   chemical formula 3 wherein M3 represents at least one selected from the group consisting of cobalt, nickel, magnesium, aluminum, boron, titanium, vanadium, chromium, iron, copper, zinc, molybdenum, tin, calcium, strontium and tungsten, and the values of z, g, and h are respectively in the following ranges: $0.8 \le z \le 1.2$, $0 \le g \le 1.0$ and $-0.2 \le h \le 0.2$.

13. The positive electrode according to claim 8, wherein in a volume-based particle size distribution, the positive electrode material has a particle diameter of 4 μm to 25 μm reaching a volume accumulation of 50% from the small particle diameter.

14. The positive electrode according to claim 9, wherein the content of strontium in the compound on the surface of the lithium composite is 0.01 wt. % to 0.4 wt. % based on the total weight of the positive electrode material.

15. A battery, comprising the positive electrode according to claim 8.

* * * * *